(12) United States Patent
Chazono

(10) Patent No.: US 6,514,603 B2
(45) Date of Patent: Feb. 4, 2003

(54) MULTILAYER CERAMIC CAPACITOR AND MANUFACTURING METHOD THEREOF

(75) Inventor: Hirokazu Chazono, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/775,696

(22) Filed: Feb. 2, 2001

(65) Prior Publication Data

US 2001/0012561 A1 Aug. 9, 2001

(51) Int. Cl.[7] .............................. B32B 5/16; C04B 35/00; H01G 9/155
(52) U.S. Cl. ................. 428/213; 264/131; 264/241; 264/615; 264/652; 361/313; 361/321.2; 361/321.4; 428/325
(58) Field of Search ................. 428/213, 325; 264/615, 652, 131, 241; 361/313, 321.2, 321.4

(56) References Cited

U.S. PATENT DOCUMENTS

| 5,225,960 | A | * | 7/1993 | Kishi et al. | 361/321 |
|---|---|---|---|---|---|
| 6,160,472 | A | * | 12/2000 | Arashi et al. | 338/21 |
| 6,205,015 | B1 | * | 3/2001 | Wada et al. | 361/321.4 |
| 6,243,254 | B1 | * | 6/2001 | Wada et al. | 361/311 |
| 6,292,354 | B1 | * | 9/2001 | Kobayashi et al. | 361/321.2 |
| 6,331,932 | B1 | * | 12/2001 | Kobayashi et al. | 361/321.2 |
| 6,362,947 | B1 | * | 3/2002 | Chazono | 361/306.3 |
| 6,383,323 | B1 | * | 5/2002 | Wada et al. | 156/89.14 |
| 6,404,616 | B2 | * | 6/2002 | Mizuno | 361/306.3 |
| 6,437,969 | B2 | * | 8/2002 | Mizuno et al. | 361/311 |

* cited by examiner

Primary Examiner—H. Thi Le
(74) Attorney, Agent, or Firm—Katten Muchin Zavis Rosenman

(57) ABSTRACT

A multilayer ceramic capacitor comprises dielectric ceramic layers and conductive layers, the dielectric ceramic layers including core-shell structured ceramic particles. The ceramic particles disposed nearer to the conductive layers have shell portions having thickness larger than those of the ceramic particles disposed farther from the conductive layers.

7 Claims, 2 Drawing Sheets

MULTILAYER CERAMIC CAPACITOR AND MANUFACTURING METHOD THEREOF

FIELD OF THE INVENTION

The present invention relates to a multilayer ceramic capacitor having dielectric layers and conducting layers laminated alternately and a manufacturing method thereof; and, more particularly, to a structure of a dielectric ceramic layer of a multilayer ceramic capacitor.

BACKGROUND OF THE INVENTION

Multilayer ceramic capacitors are normally manufactured by first mixing a dielectric ceramic powder such as $BaTiO_3$ with additives and a binder and then stirring the mixture using, for example, a ball mill for several hours, thereby obtaining a slurry having a preferable viscosity.

Next, ceramic green sheets are made out of the slurry by using, for example, a doctor blade method and the like. In the doctor blade method, the slurry is cast onto a base film and dried thereon to thereby form a ceramic green sheet having a predetermined thickness. The thickness of the ceramic green sheet is controlled by adjusting a gap between the base film and a doctor blade.

Then, a conductive paste is printed in a predetermined pattern on the ceramic green sheet. Thereafter, a number of the ceramic green sheets are laminated and pressed, thereby forming an unsintered laminated body. The unsintered laminated body is diced into a plurality of green chips and the green chips are sintered. During the sintering, the ceramic green sheets are turned into dielectric layers and the conductive paste is turned into conductive layers. Finally, a conductive paste is coated on the sintered chips, which becomes external electrodes in finished products.

In such a multilayer ceramic capacitor, delamination or crack generation remains as problems to be solved. One of the causes of delamination stems from a difference between the shrinkage rate of the ceramic green sheet and that of the conductive paste during the sintering. In a generally adopted method for preventing delamination, the dielectric ceramic powder, which is used to form the ceramic green sheet, is added into the conductive paste. The dielectric ceramic powder added into the conductive paste for preventing delamination is referred to as "common material".

However, as the thickness of each dielectric layer of the multilayer ceramic capacitor becomes smaller to meet the requirement for higher capacity and smaller size, changes in the characteristics of the dielectric layers by diffusion of the common material thereinto may become significant.

SUMMARY OF THE INVENTION

It is, therefore, an object of the present invention to provide a multilayer ceramic capacitor having a preferable voltage withstand characteristic and being capable of accomplishing a higher capacitance and smaller size.

In accordance with one aspect of the present invention, there is provided a multilayer ceramic capacitor comprising dielectric ceramic layers and conductive layers, the dielectric ceramic layers including core-shell structured ceramic particles, wherein the ceramic particles disposed nearer to the conductive layers have shell portions having thicknesses larger than those of the ceramic particles disposed farther from the conductive layer.

As another aspect of the present invention, there is provided a manufacturing method of a multilayer ceramic capacitor which comprises the steps of preparing a slurry by mixing a first dielectric ceramic powder with a first additive and a binder, forming a ceramic green sheet by using the slurry, preparing a conductive paste by mixing a second dielectric ceramic powder with a second additive, the second additive including at least one component of the first additive, printing the conductive paste on the ceramic green sheet, forming a laminated body by laminating a plurality of the ceramic green sheets having the conductive paste printed thereon, and sintering the laminated body.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A preferred embodiment in accordance with the present invention will now be described with reference to the accompanying drawings.

Figure 1:
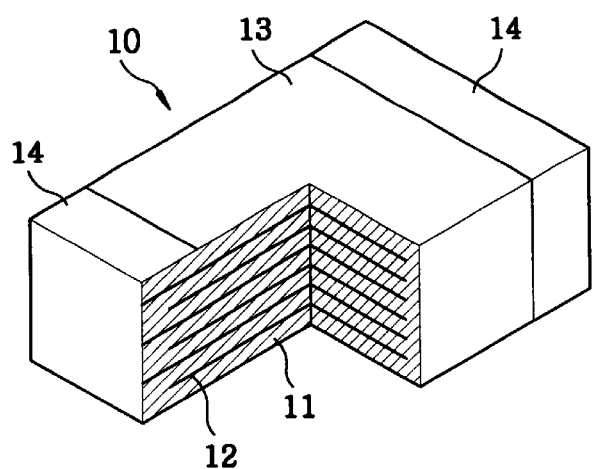
FIG. 1 is a perspective view of a multilayer ceramic capacitor, cut partly in section, in accordance with the present invention.
Figure 2:
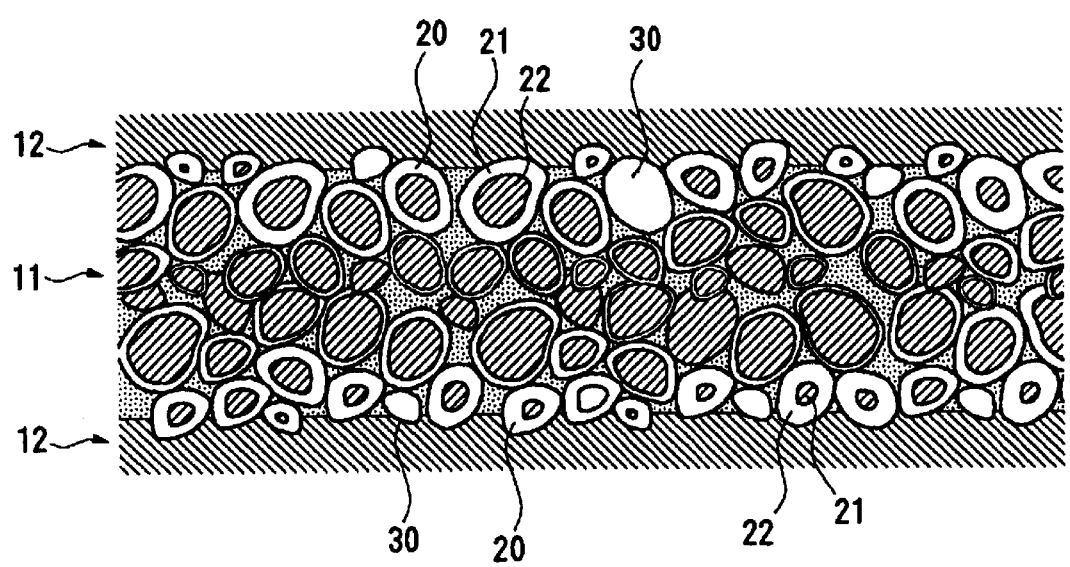
FIG. 2 illustrates an enlarged sectional view of a multilayer ceramic capacitor in accordance with the present invention.

FIG. 1 is a perspective view of a multilayer ceramic capacitor, cut partly in section, in accordance with the present invention and FIG. 2 illustrates an enlarged sectional view of a multilayer ceramic capacitor in accordance with the present invention.

As shown in FIG. 1, the multilayer ceramic capacitor includes a laminated body 13 having dielectric layers, one of which is presented with a reference numeral 11, and conductive layers, one of which is presented with a reference numeral 12, stacked alternately. The multilayer ceramic capacitor further includes external electrodes 14 which are formed at both sides of the laminated body 13 and electrically connected to the conductive layer 12. One external electrode 14 is connected with every other conductive layer and the other external electrode is connected with the remaining conductive layers.

The dielectric layer 11 is comprised of a sintered ceramic material having ferroelectricity such as $BaTiO_3$. The conductive layer 12 includes, for example, noble metals such as Pd or Ag, and base metals such as Ni. The laminated body 13 is formed by laminating a plurality of the ceramic green sheets having a conductive paste printed thereon and sintering the ceramic green sheets. During the sintering, the ceramic green sheets are turned into dielectric layers and the conductive paste is turned into conductive layers. The external electrodes are formed of metals such as Ni, Ag and the like.

As shown in FIG. 2, the dielectric layer 11 includes core-shell structured ceramic particles 20 and non-core-shell structured ceramic particles 30. The term "core-shell structure", as used herein, refers to a structure of a ceramic particle including a core 21 at the center portion of the ceramic particle and a shell portion 22 which has a status physically and chemically different from that of the core 21.

The nearer to the conductive layer 12 the core-shell structured ceramic particles 20 are disposed, the larger the thickness of the shell portion 22 thereof becomes.

According to the present invention, electric permittivity can also be enhanced. There are two types of the non-core-shell structured ceramic particles. A first type of non-core-shell structured ceramic particle is a ceramic particle having a substantially same composition with that of the core of the core-shell structured ceramic particle and a second type of non-core-shell structured ceramic particle is a ceramic particle having a substantially same composition with that of the shell portion of the core-shell structured ceramic particle. The core 21 has a relatively high electric permittivity and thus the first type non-core-shell structured ceramic particle has an electric permittivity higher than any other type of particles. Further, the shell portion 22 has a relatively high voltage withstand characteristic depending on the additive and thus the second type non-core-shell structured ceramic particle has a voltage withstand characteristic higher than any other type of particles. Therefore, by the first type non-core-shell structured ceramic particles, electric permittivity is enhanced and, by the second type non-core-shell structured ceramic particles, the voltage withstand characteristic is enhanced. According to the present invention, voltage withstand characteristic of the dielectric ceramic layer is enhanced by the second type non-core-shell structured ceramic particles which are disposed near the conductive layer.

The ratio of the sum of the core-shell structured ceramic particles and the first type non-core-shell structured ceramic particles to the second type non-core-shell structured ceramic particles is preferably in a range from 9:1 to 7:3 and is about 8:2 in the present embodiment.

Figure 3:
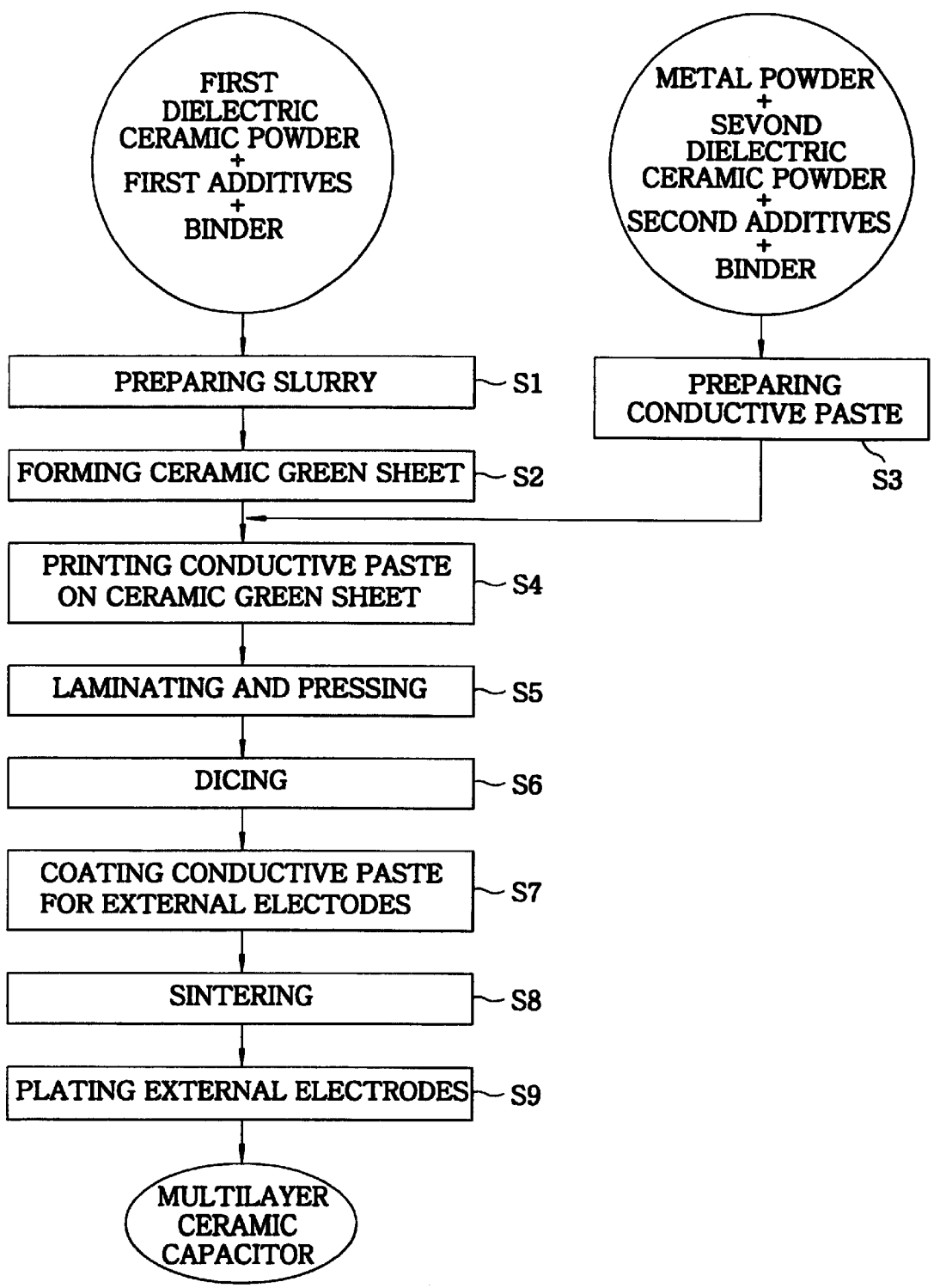
FIG. 3 presents a schematic block diagram of a manufacturing method of a multilayer ceramic capacitor in accordance with the present invention.

A manufacturing method of a multilayer ceramic capacitor in accordance with the present invention will be described hereinafter with reference to FIG. 3.

First, a slurry is prepared by mixing a first dielectric ceramic powder with a first additive and a binder (step S1). As the first dielectric ceramic powder, $BaTiO_3$ powder having an average particle size of 0.35 $\mu$m is used. As the first additive, rare-earth oxides are mainly used; and, more specifically, a powder mixture including Mgo, $Ho_2O_3$, $Sm_2O_3$ and a sintering aid such as $BaSiO_3$ is used. Thereafter, the slurry is cast by using a doctor blade method to thereby form a ceramic green sheet (step S2).

Further, a metal powder of noble metals, for example, Pd, Ag and the like, and base metals such as Ni is mixed with a second dielectric ceramic powder, a second additive and a binder, thereby obtaining a conductive paste (step S3). The metal powder mixture is a main component forming the conductive layer and, in the present embodiment, Ni is utilized therefor.

The second dielectric ceramic powder is added to the conductive paste for making the shrinkage rate of the conductive paste similar to that of the ceramic green sheet during sintering. Thus, it is preferable that the second dielectric ceramic powder has a shrinkage rate similar to that of the first dielectric ceramic powder. In the present embodiment, the second dielectric ceramic powder has a same composition as that of the first dielectric ceramic powder. The average particle size of the second dielectric ceramic powder is below one-half of that of the first dielectric ceramic powder.

The second additive includes at least one component of the first additive and facilitates the growth of the shell portion of ceramic particles included in the ceramic green sheet. In the present embodiment, mixture of MgO, $Sm_2O_3$ and $BaSiO_3$ is employed as the second additive.

The conductive paste is printed on the ceramic green sheet in a predetermined pattern (step S4). Thereafter, a plurality of the ceramic green sheets are laminated and pressed, thereby forming a laminated body (step S5). The laminated body is diced into a number of green chips (step S6). A conductive paste for forming external electrodes is coated on the green chips (step S7).

The green chips are sintered under a predetermined sintering condition (step S8). The sintering condition is determined by the compositions of the dielectric ceramic powder and the conductive paste. In the present embodiment, the green chips are sintered first at a temperature of 1320° C. under a reductive atmosphere and then at a temperature of 1000° C. under a weak-oxidizing atmosphere.

Finally, the external electrodes are plated, thereby obtaining the multilayer ceramic capacitor 10.

During the sintering (step S8), the ceramic green sheets are turned into the dielectric ceramic layer 11 and the conductive paste printed on the ceramic green sheet is turned into the conductive layer 12. The second additive included in the conductive paste is diffused into the ceramic green sheets during the sintering. Since the second additive includes at least one component of the first additive, the growth of shell portions of ceramic particles near the conductive layers is facilitated. Therefore, the core-shell structured ceramic particles included in the dielectric ceramic layer and adjacent to the conductive layer have relatively larger shell portions than the ceramic particles disposed relatively remote from the conductive layer when sintering is finished. By such an arrangement, the voltage withstand characteristic of the multilayer ceramic capacitor is enhanced. Further, the dielectric ceramic layer 12 can be made thinner and, therefore, the requirement for higher capacitance and smaller size can also be accomplished.

In the present embodiment, the dielectric ceramic layer, the conductive layer 12 and the external electrodes 14 are sintered at a same time. However, the present invention is not limited thereto. That is, sintering of the green chips may be carried out first in step S6 to obtain sintered chips and then the conductive paste may be coated on the sintered chips and sintered, thereby forming external electrodes.

While the present invention has been described with respect to the particular embodiments, it will be apparent to those skilled in the art that various changes and modifications may be made without departing from the spirit and scope of the invention as defined in the following claims.

What is claimed is:

1. A multilayer ceramic capacitor comprising dielectric ceramic layers and conductive layers, the dielectric ceramic layers including core-shell structured ceramic particles, each core-shell structured ceramic particle having a core and a shell portion, wherein the ceramic particles disposed nearer to the conductive layers have shell portions having thicknesses generally larger than those of ceramic particles disposed farther from the conductive layers.

2. The multilayer ceramic capacitor of claim 1, wherein the dielectric ceramic layers further include a first and a second type non-core-shell structured ceramic particles, the first type non-core-shell structured ceramic particles being ceramic particles having a substantially same composition with those of the core of the core-shell structured ceramic particles and the second type non-core-shell structured ceramic particles being ceramic particles having a substantially same composition with those of the shell portion of the core-shell structured ceramic particles, and wherein ratio of the sum of the core-shell structured ceramic particles and the first type non-core-shell structured ceramic particles to the second type non-core-shell structured ceramic particles is in a range from 9:1 to 7:3.

3. The multilayer ceramic capacitor of claim 2, wherein the non-core-shell structured ceramic particles is disposed at interfaces between the dielectric ceramic layers and the conductive layers or adjacent to the conductive layers.

4. A method for manufacturing the multilayer ceramic capacitor of claim 1, comprising the steps of:

preparing a slurry by mixing a first dielectric ceramic powder with a first additive and a binder;

forming a ceramic green sheet by using the slurry;

preparing a conductive paste by mixing a second dielectric ceramic powder with a second additive, the second additive including at least one component of the first additive;

printing the conductive paste on the ceramic green sheet;

forming a laminating body by laminating a plurality of the ceramic green sheets having the conductive paste printed thereon; and sintering the laminated body.

5. The method of claim 4, wherein the first dielectric ceramic powder has a same composition as that of the second dielectric ceramic powder.

6. The method of claim 5, wherein average particle size of the second dielectric ceramic powder is below or equal to one-half of that of the first dielectric ceramic powder.

7. The method of claim 4, wherein the second additive includes one or more components for facilitating the sintering of the dielectric ceramic layer.

* * * * *

UNITED STATES PATENT AND TRADEMARK OFFICE
CERTIFICATE OF CORRECTION

PATENT NO.    : 6,514,603 B2
DATED         : February 4, 2003
INVENTOR(S)   : H. Chazono It is certified that error appears in the above-identified patent and that said Letters Patent is hereby corrected as shown below:

<u>Title page,</u>
Item [30], please add the Foreign Application Priority Data to read:
-- JP 2000-026461 02/03/2000 --

Signed and Sealed this

Tenth Day of June, 2003

JAMES E. ROGAN
*Director of the United States Patent and Trademark Office*